Dec. 28, 1965  G. P. PEAK, SR  3,225,809
LOCK NUT COMBINATION
Filed June 15, 1964
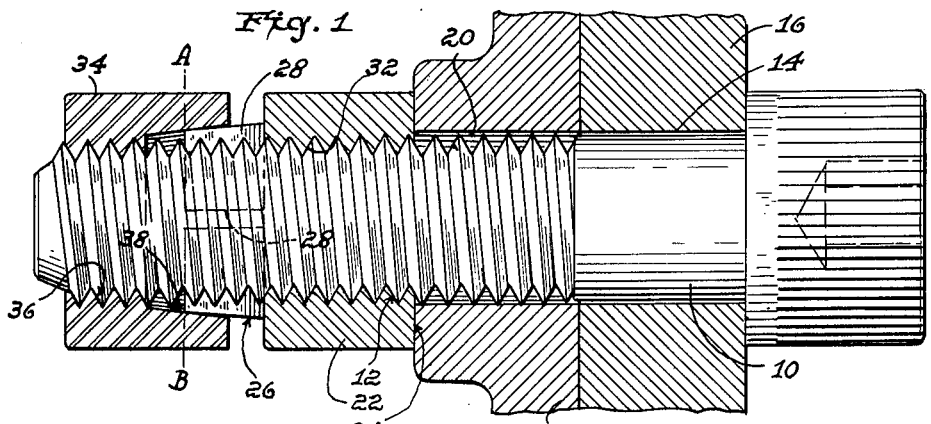
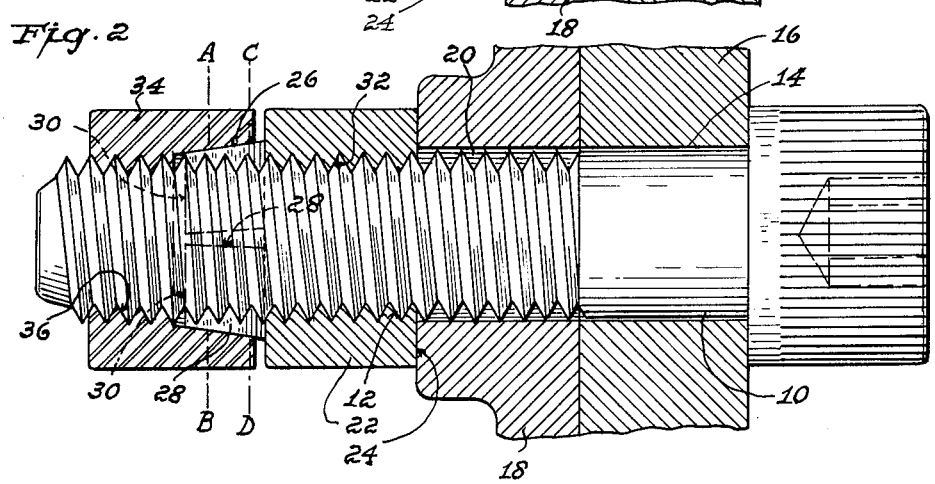
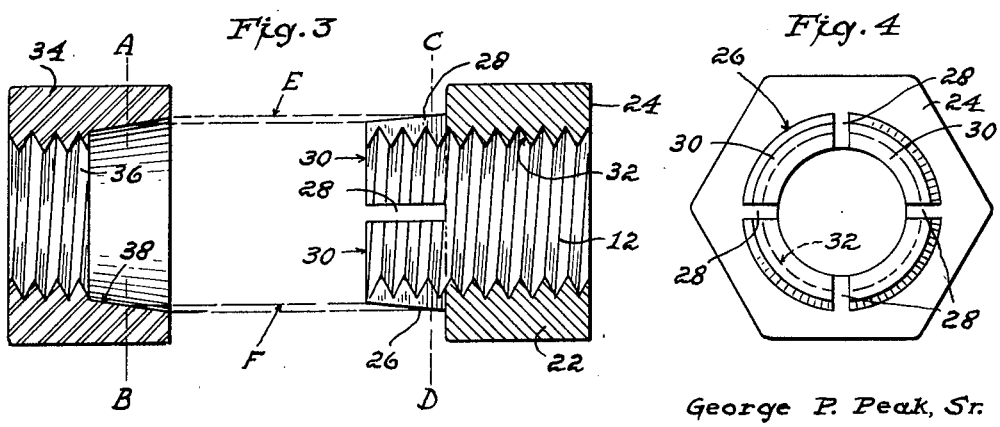
George P. Peak, Sr.
INVENTOR.
BY *J. W. Wills*
ATTORNEY

United States Patent Office 3,225,809
Patented Dec. 28, 1965

3,225,809
LOCK NUT COMBINATION
George P. Peak, Sr., Trenton, N.J., assignor of one-half to Parker C. Peak, Opa-locka, Fla.
Filed June 15, 1964, Ser. No. 374,939
1 Claim. (Cl. 151—19)

This invention relates to lock nut combinations of the general type comprising a major holding nut having a slotted frusto-conical extension and a jam nut having a conical socket or recess into which the extension of the holding nut is forced to contract it into locking engagement with the threads of a headed or stud bolt.

One of the principal objects of the present invention is to provide an improved lock nut combination of the general character mentioned having positive locking means without the use of crosspins in the bolt, and which can be loosened and retightened repeatedly without impairment of its effectiveness.

My improved lock nut combination is especially advantageous in connection with farm and many other types of machines subject to continuous vibration in operation and in which it is essential to safety, as well as performance, that the major bolts holding certain parts or elements not only be held in securely fixed relation on the machine, but that they be capable of quick loosening and secure retightening in the making of repeated adjustments and replacements.

A further object of the present invention is to provide an improved lock nut combination having not only the facility of quick loosening and secure tightening of bolts holding critical parts or elements in adjustable relation on machines or equipment, but also effective resistance to corrosion from salt water, chemicals and weather conditions, as, for example, in marine equipment around motors, shafts, manifolds, stuffing boxes and other structural features where conditions of vibration and corrosion are constant problems. The prevention of corrosion is accomplished by making the holding nut of bronze or the like and the jam nut of stainless steel; and this diversity of materials is also an important factor in the effectiveness of the combination, although for certain conditions where the only problem is vibration the holding nut may be made of any ductile metal of softer character than that of the jam nut.

A still further object of this invention is to provide a lock nut combination of the character and having the advantageous features mentioned and which can be economically produced by automatic machines.

The many types of machinery and equipment on which my improved lock nut combination can be utilized to the advantage of greatly increased safety and efficiency of operation include, besides farm and marine machinery and equipment, also airplanes, space equipment, railway equipment, automobiles, trucks, busses, tractors, trailers, motor vehicles of all kinds, construction and drag line equipment; and many other kinds of machinery and equipment.

Other objects and advantages of my improved lock nut combination will be apparent or pointed out in the following specification in which reference is had to the accompanying drawings forming a part thereof, and in which:

FIG. 1 is a sectional view of my improved lock nut combination on a bolt at the beginning of the locking action;

FIG. 2 is a view similar to FIG. 1 but showing the locking action completed;

FIG. 3 are sectional views of the jam nut and holding nut and with broken linking lines indicating their relative novel features of construction; and FIG. 4 is an end view of the holding nut looking toward the smaller end of its slotted frusto-conical extending portion.

Referring to the drawings in which like numerals designate like parts in the several views, 10 designates a bolt of conventional design which may be a headed bolt, as illustrated, or a stud bolt having threads 12. This bolt is shown as inserted through an opening 14 in a wall portion 16 of a machine or equipment for removably attaching thereto a part or element 18 having a through opening 20 for insertion therethrough of the bolt 10.

A holding nut 22 has at one end a flat face 24 for clamping contact with the part 18 and at its other end an integral frusto-conical portion 26 projecting axially therefrom and divided by longitudinal slots 28 into a plurality of fingers 30. This nut is provided with internal threads 32 extending throughout the fingers 30 for engagement with the threads 12 of the bolt 10; and there may be as many fingers as the conditions of usage may warrant.

A jam nut 34 is provided at one end with internal threads 36 corresponding to the threads 32 of the holding nut and extending throughout a portion of the jam nut. This nut is also provided with a conical socket or recess 38 diverging from the inner end of the threaded portion for reception of the frusto-conically disposed fingers 30 of the holding nut, so that, with both nuts 22 and 34 in position on the bolt 10, as shown in FIG. 1, the conical socket will cause the fingers 30 to contract into locking engagement with the threads 12 of the bolt, as shown in FIG. 2, when the jam nut is forcibly moved toward the holding nut 22 along the threads 12 of the bolt 10.

Recognizing that previous lock nut combinations have embodied certain structural details corresponding generally to some of those just described, I will now describe the distinctive locking features of my improved lock nut combination which render it more effective and safer against loosening under conditions of vibration than previous lock nut combinations of which I am aware, and also capable of being repeatedly and quickly loosened and retightened, as in making adjustments, without any impairment of its locking effectiveness; and also which render it resistant to corrosion from salt water, chemicals and weather conditions.

In the formation of the holding nut 22 and the jam nut 34, as shown in FIG. 3, it will be seen that the frusto-conical portion 26 of the holding nut 22 is of a lesser angle of taper than that of the conical socket 38 of the jam nut 34 and of approximately the same length as the socket between its outer end and the threaded portion 36 of the jam nut; and also that the smaller end of the frusto-conical portion 26 is in coincidence with the diameter of the socket 38 at a plane approximately midway between the outer end of the socket and its threaded portion 36, as indicated by broken line A–B, so that at the start of the locking action, as shown in FIG. 1, the outer or free ends of the fingers 30 are in contact with the midway plane of the socket 38. I have found a taper of about 5 degrees for the frusto-conical portion of the holding nut and about 9 degrees for the conical socket 38 to be adequate.

As shown in FIG. 2, the difference of about four degrees in the angles of taper of the frusto-conical portion 26 of the holding nut 22 and the conical socket 38 of the jam nut 32 is adequate to force the peripheral surfaces of the fingers 30 into linear contact with the socket 38 from the free ends of the fingers to the outer end of the socket with the fingers rigidly clamped between the socket 38 and the threads 12 of the bolt 10, but with the difference in the angles not sufficient to prevent the complete setting up of the jam nut on the frusto-conical portion 26.

Also as illustrated in FIG. 3, it will be seen that the outer diameter of the socket 34 is coincident with the diameter of the frusto-conical portion 26 at a plane a short distance from the end of the holding nut 22, as indicated by broken line C-D. As shown in FIG. 2, when the locking action of the fingers 30 against the threads 12 of the bolt 10 is completed the ends of the fingers 30 are slightly short of the threaded portion 36 of the socket 38 and the jam nut is slightly short of the opposed end of the holding nut 22. Also when the locking action is completed the outer edge of the socket 38 is in wedging or rigid contact with the frusto-conical portion of the holding nut slightly beyond the plane indicated by the broken line C-D. This arrangement not only provides a double lock against loosening of the nuts 22 and 34, but also provides ample space for further tightening of the jam nut in the event of wear of the ends of the fingers 30 from repeated loosening and retightening.

As shown in FIG. 2, when the wedging action referred to above occurs the peripheral surfaces of the fingers 30 will also be in rigid linear contact with the socket 38 of the jam nut, as previously described, thereby providing a double locking effect against backward rotation of the jam nut.

It should here be pointed out that it is essential in my improved lock nut combination that the holding nut 22 be made of a ductile metal of a lesser hardness than the metal of the jam nut. I have found that bronze holding nut 22 and a stainless steel jam nut 34 will not only remain free from seizing of the metals, but with the diverse tapers of the frusto-conically disposed fingers of the holding nut and the conical socket of the jam nut, as already described, will provide a lock nut combination which (1) can be quickly tightened into rigid locking relation with the threads of the bolt 10; (2) which will hold safely against constant vibration without the use of a cross pin or the like; and (3) which can be quickly and repeatedly loosened and retightened into locking relation in the making of adjustments of parts or elements of machinery or equipment without any impairment of its locking effectiveness. Also (4) the bronze and stainless steel nuts will effectively resist the corrosive action of salt water, chemicals and weather conditions. For uses where corrosion is not a problem the holding nut 22 and the jam nut 34 may be made of other suitable diverse metals.

From the foregoing description it will be seen that my improved lock nut combination is clearly distinguished from previous lock nut combination of similar general character in the essential structural features which provide my lock nut combination with the above described advantages.

Obviously various changes or modifications may be made in my improved lock nut combination without departing from the spirit or scope of my invention. Therefore, it should be understood that the embodiment of my invention shown and described is intended to be illustrative only and restricted only by the appended claim.

I claim:

In the combination of a threaded bolt, an internally threaded metal holding nut including an integral, internally threaded frusto-conical portion divided by longitudinal slots into a plurality of fingers projecting axially from one end of said nut, and in internally threaded metal jam nut having a conical socket diverging from the inner end of the threaded portion of said jam nut for reception therein of the frusto-conical portion of said holding nut; said holding nut being made of a ductile metal of a lesser hardness than that of said jam nut, the angle of taper of said frusto-conical portion being about 5 degrees, and that of the socket being about 9 degrees, the diameter of the smaller end of the frusto-conical portion of said holding nut being coincident with the diameter of the socket in said jam nut at a plane approximately midway between the outer end of said socket and the threaded portion of said nut to permit the necessary forcible movement of the jam nut toward the holding nut to contract the fingers of said holding nut into locking engagement with the threads of said bolt, with the outer peripheries of said fingers in rigid linear contact with said socket from the free ends of said fingers to the outer end of said socket when the locking engagement is completed, the frusto-conical portion of the holding nut being of the correct length to leave said holding nut short of the end of the jam nut, and the free ends of said fingers short of the opposed smaller end of the socket in the jam nut when the locking engagement is completed; and the larger diameter of the frusto-conical portion of the holding nut being greater than that of the outer end of the conical socket of said jam nut, so that the axial movement of the jam nut in forcing the fingers of the holding nut into locking engagement with the threads of the bolt will also bring the frusto-conical portion of the holding nut into rigid contact with the outer edge of the socket in said jam nut.

References Cited by the Examiner
UNITED STATES PATENTS

| 1,346,730 | 7/1920 | Viebrock | 151—19 |
| 2,384,953 | 9/1945 | Miller | 151—19 |

FOREIGN PATENTS

| 109,349 | 5/1925 | Switzerland. |

EDWARD C. ALLEN, *Primary Examiner.*